(12) United States Patent
Jakobsson

(10) Patent No.: US 6,598,163 B1
(45) Date of Patent: Jul. 22, 2003

(54) FLASH MIXING APPARATUS AND METHOD

(75) Inventor: Bjorn Markus Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/365,947

(22) Filed: Aug. 2, 1999

(51) Int. Cl.$^7$ ................................................. G06F 1/24
(52) U.S. Cl. ........................ 713/176; 713/152; 713/200; 713/201
(58) Field of Search ................................. 713/152, 168, 713/189, 200, 201, 176

(56) References Cited

U.S. PATENT DOCUMENTS

| | | | |
|---|---|---|---|
| 4,757,533 A | * | 7/1988 | Allen et al. .................. 713/192 |
| 4,965,568 A | * | 10/1990 | Atalla et al. ................ 340/5.85 |
| 5,485,519 A | * | 1/1996 | Weiss .......................... 713/185 |

OTHER PUBLICATIONS

Prior Art—"Addition Chain Heuristics", Jurjen Bos et al, pp. 400–407, The Netherlands.

* cited by examiner

Primary Examiner—Thomas R. Peeso

(57) ABSTRACT

The present invention provides an efficient mix network in which an initial list of encrypted inputs is duplicated to provide a plurality of list copies. Each list copy is then subjected to a chain of re-encryptions performed by a plurality of mix servers. There are a plurality of chains, one chain for each list copy. The final output of each chain of re-encryptions is sorted so that the outputs can be compared with one another. The outputs of each chains can be sorted using tag lists. The outputs can be compared with one another by applying difference or relative re-encryption factors. If the outputs are the same (after sorting) then further computations can be conducted. If not then one of the mix servers has cheated. A signed signal of acceptability is produced by a sorting and comparison module. The present invention takes a list of ciphertexts and produces a permuted list of ciphertexts, so that the output list corresponds to the same plaintext values as the input ciphertext list element does, but in a different and random order. This could be used for voting schemes where votes need to be "mixed" so that it is not possible to determine who voted what.

27 Claims, 6 Drawing Sheets

FLASH MIXING APPARATUS AND METHOD

FIELD OF THE INVENTION

This invention relates to improved methods and apparatus for mix networks.

BACKGROUND OF THE INVENTION

In a mix-network, a list of encrypted inputs is iteratively permuted and re-encrypted (or blinded, or decrypted, depending on the specific implementation) by a set of cooperating mix servers. As long as at least one of these servers is honest, the privacy of the output is guaranteed in that it is infeasible for cheaters to match items of the final mix network output list to items of the initial mix network input list with a probability non-negligibly exceeding that of guessing uniformly at random.

Early mix networks were not "robust" meaning that one or more mix servers could corrupt the computation causing an incorrect final mix network output list without this being noticed. Various mix networks have been proposed that have greater "robustness" but these entail a high amount of computation. All mix networks to date require each mix server to know a portion of the secret key corresponding to the public key used for the initial encryption.

The applicant's previous mix network has a cost per input item (of the initial input encrypted list) and per active mix server of about eighty exponentiations, each one of which costs about 200 multiplications for an exponent size of 160, bits using standard window based exponentiation techniques. Although this amount of computation may be favorable compared to other mix networks there is a need for greater efficiency, along with robustness and privacy.

SUMMARY OF THE INVENTION

The present invention provides an efficient mix network in one embodiment in which an initial list of encrypted inputs is duplicated to provide a plurality of list copies. Each list copy is then subjected to a chain of re-encryptions performed by a plurality of mix servers. There are a plurality of chains, one for each input list copy. The final output lists of each chain of re-encryptions is sorted so that the output lists can be compared with one another. If the outputs are the same (after sorting) then further computations can be conducted. If not then one of the mix servers has cheated.

Sorting can be performed by the use of tag lists. Each item of each input list can have a tag associated with it. The same tag is associated to corresponding items of each input list copy. Each tag, or a modification of each tag, remains attached to the same item (or a modification of the same item) even after the items have been modified by permutations and re-encryptions. Each item of each final output list has associated with it a tag of an output tag list. The final output lists, for the first input copy, second input copy, etc., each have the same output tag list associated with them with the exception that the tags are in different orders. The final output lists can be sorted with respect to the tag values.

The final sorted output lists of the first chain and the second chain can be compared by applying to the sorted second chain output list the difference between re-encryptions applied for the second chain and re-encryptions applied for the first chain of re-encryptions. These re-encryption differences can be determined from a plurality re-encryption differences received from plurality of mix servers. The final sorted output lists of the first chain and other chains can be compared in similar manners.

The mix network of an embodiment of the present invention provides a robust technique, meaning that cheating mix servers can easily be detected. It also provides for privacy, in that the items of the final output list cannot be related back to items of the initial encrypted list by any of the mix servers assuming at least one mix server is honest. The amount of computation required in the mix network of an embodiment of the present invention is drastically less than prior art mix networks. In addition, there is no need to know the secret keys corresponding to the public key under which encryption is done.

The present invention in one embodiment takes a list of ciphertexts and produces a permuted list of ciphertexts, so that the output list corresponds to the same plaintext values as the input ciphertext list element does, but in a different and random order. This could be used for voting schemes where votes need to be "mixed" so that it is not possible to determine who voted what.

DETAILED DESCRIPTION OF THE DRAWINGS

Figure 1:
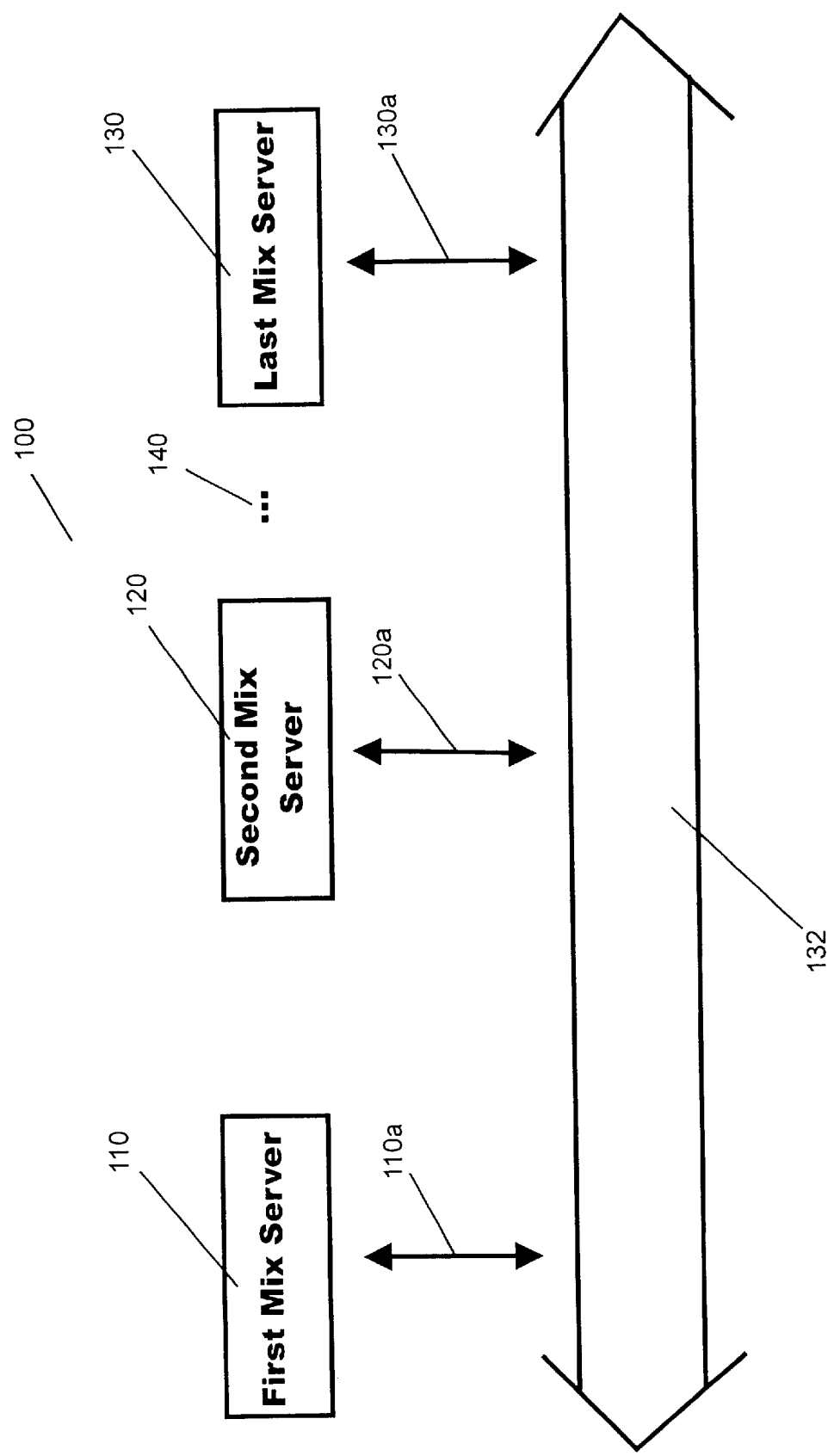
FIG. 1 shows a plurality of mix servers connected to each other by a data bus.

FIG. 1 shows a system 100 comprised of a mix server 110, a second mix server 120, and a last mix server 130. The three dots 140 indicate that there may be any number of mix servers, where "last" can be any integer number. The mix servers 110, 120, and 130 are connected by data busses 110a, 120a, and 130a to the overall data bus 132. The mix servers 110, 120, and 130 thus can all communicate with one another. The mix servers 110, 120, and 130 may be separate personal computers or may be programming modules of the same personal computer or other special-purpose hardware.

Figure 2:
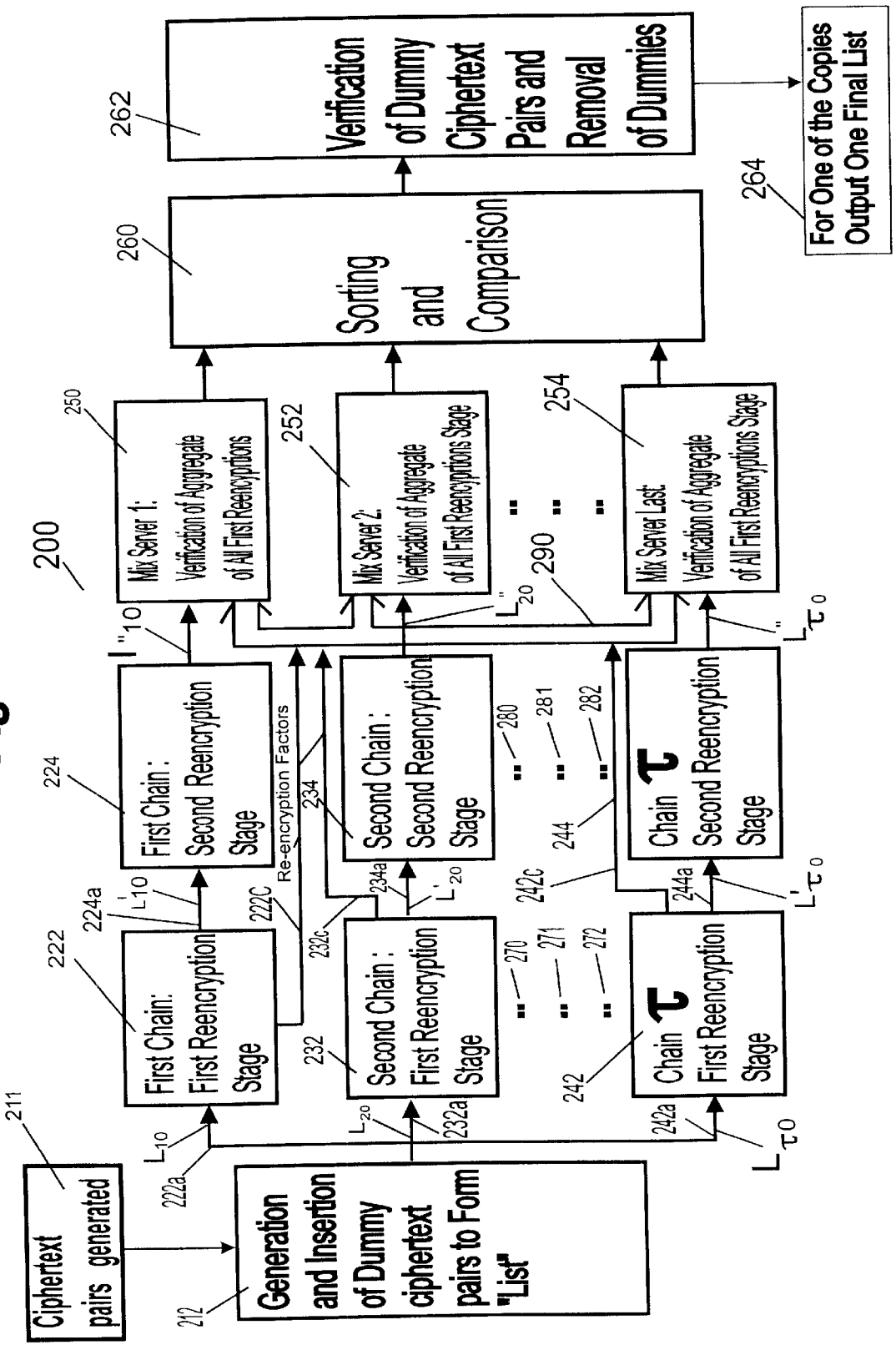
FIG. 2 shows a flow chart in accordance with an embodiment of the present invention.

FIG. 2 shows a flow diagram 200 concerning a method in accordance with an embodiment of the present invention using the mix servers 110, 120, and 130 (and any further plurality of mix servers) shown in FIG. 1. At step 211 a set of encrypted ciphertext pairs comprised of: $(a_1, b_1)$, $(a_2, b_2), \ldots (a_n, b_n)$ is generated not necessarily by servers 110, 120, or 130 but they may be generated by other processors, such as voters who encrypt their votes before posting them at step 212. Step 212 may include posting to an electronic their votes before posting them at step 212. Step 212 may include posting to an electronic bulletin board as known in the art. Each $a_i = m_i y^{\alpha_i}$, each $b_i = g^{\alpha_i}$, and n is the total number of encrypted ciphertext pairs in the set. The quantity $m_i$ is a plain text message, $y = g^x$ is a public key, g is a generator, and $\alpha_i$ is a random number, where $1 <= i <= n$.

At step 212 two dummy ciphertext pairs $(a_{n+1}, b_{n+1})$ and $(a_{n+2}, b_{n+2})$ are added to the set of input ciphertext pairs to form what will be called an input "list" with dummies. The input "list" with dummies of ciphertext pairs is comprised of: $(a_1, b_1), (a_2, b_2), \ldots (a_n, b_n), (a_{n+1}, b_{n+1})$, and $(a_{n+2}, b_{n+2})$.

The two dummy ciphertext pairs are created in a way so that no subset of the servers 110, 120, and 130 (and any further number of servers) know what plaintexts they correspond to, even if all the plaintexts $m_1$ through $m_n$ corresponding to the input set of encrypted ciphertext pairs were to be revealed. The ciphertexts (not including the dummy ciphertext pairs) can be given to the mix servers such as mix server 110, 120 and 130 by users. The dummy ciphertext pairs can either be constructed collectively, by contribution by each server of servers 110, 120, and 130 (or any further number of servers) of one portion of the ciphertext or by setting each of the two dummy ciphertext pairs to a random bit string that no subset of servers controls. Each server for the number of servers j=1 to k prepares "partial" ciphertexts $(a_{n+1j}, b_{n+1j})$ and $(a_{n+2j}, b_{n+2j})$ from "partial" plaintexts. These partial ciphertexts are then multiplied together to form the dummy ciphertexts, i.e. $a_{n+1}=a_{n+11}*a_{n+12}* \ldots a_{n+1k}$ and $b_{n+1}=b_{n+11}*b_{n+12}* \ldots b_{n+1k}$. In this way no server knows the plaintext corresponding to the dummy ciphertexts.

The input "list" which includes the dummy ciphertext pairs is duplicated as "Copy 1", "Copy 2", . . . "Copy τ". τ copies of the input "list" are made, where $\tau=1-(\log_2\epsilon)/(2\log_2 n)$ for a security parameter ε indicating the maximum failure probability. Here n is the number of ciphertext pairs in original set of ciphertext pairs (prior to adding dummies) which was generated at step 211. The parameter ε is an arbitrary probability. For example, $\epsilon=10^{-6}$, if a maximum probability of one in a million is desired. Typically we want an even smaller maximum failure probability.

The first input list copy is subject to a first chain of re-encryptions, wherein each re-encryption includes a permutation. The first re-encryption chain is comprised of first and second re-encryption stages 222 and 224. The second through τth input list copies are also subjected to second through τth chains of re-encryption (and permutation), respectively. The second re-encryption chain includes first and second re-encryption stages 232 and 234. The τth chain of re-encryptions includes first and second re-encryption stages 242 and 244. Each further chain of re-encryptions (and permutations) includes a first and second re-encryption stage.

Figure 3:
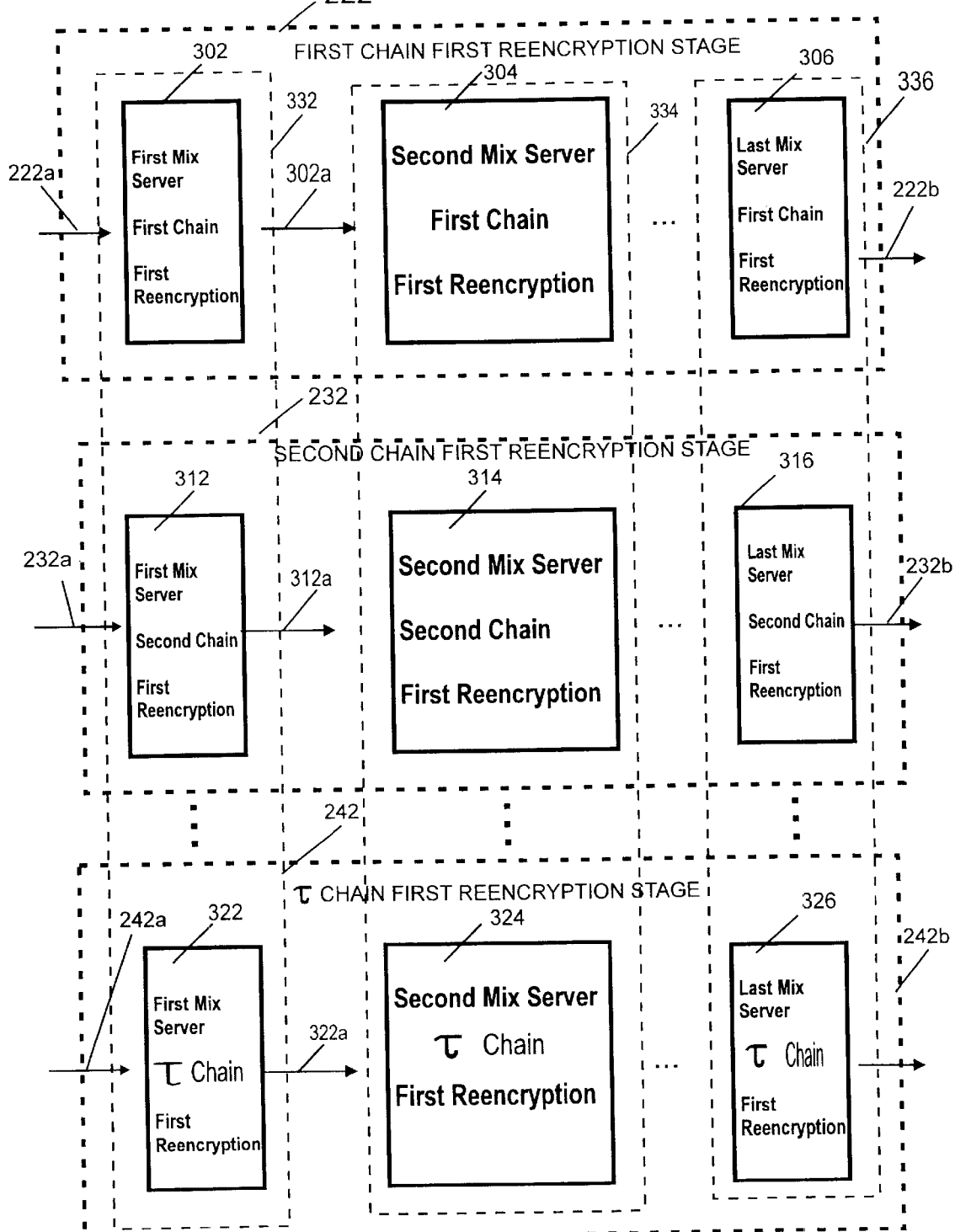
FIG. 3 shows a flow chart concerning the first encryption stages for a plurality of chains of re-encryption.

Input "List Copy 1" of the ciphertext pairs (including dummies) is subject to a first chain first re-encryption stage at step 222. The first chain first re-encryption stage 222 is comprised of a plurality of re-encryptions by a plurality of mix servers as shown in FIG. 3. At step 302 of the first chain first re-encryption stage 222, the input "list copy 1" is subject to a first chain first re-encryption by the first mix server 110. The list is also subject to a permutation at step 302. The resulting list of items is then sent to mix server 120 which implements its own first re-encryption and permutation at step 304. The resulting list of items is then sent to mix server 130, which also implements its own first re-encryption and permutation at step 306. The first-re-encryptions of the different mix servers can be provided in a similar manner but are different. Any further number of mix servers may provide re-encryption and permutations. Each re-encryption is done on a per item (i.e. per ciphertext pair) basis.

Each mix server j (for j=1 to "last", i.e. mix server 1 is first mix server 110 etc.) generates secret and random re-encryption factors. All exponentiation can be performed using addition chains, in order to limit the cost of computations. Such exponentiation and addition chains are known in the art. The step of generating secret and random encryption factors for each mix server j can be done at a pre-processing phase prior to the input set of ciphertext pairs being generated at step 211 of FIG. 2. Each mix server j produces re-encryption triples $(\alpha_{jti}, y^{\alpha jti}, g^{\alpha jti})$ and $(\beta_{jti}, y^{\beta jti}, g^{\beta jti})$ for 1<=t<=τ; and for 1<=i<=n+2. Again τ is the number of duplicates or copies of the input "list", and the number of "chains" of re-encryption (wherein each copy includes dummy ciphertext pairs) and n is the number of input ciphertext pairs (not including dummies) in the list. Each mix server j produces secret and random numbers $\alpha_{jti}$ and $\beta_{jti} \in_u Z_q$, i.e selected uniformly at random from the range of number 0 . . . q−1. Both $\alpha_{jti}$ and $\beta_{jti}$ are chosen as such, but both are different and independent such random numbers. The re-encryption and permutation computation for each mix server j is performed locally by each individual mix server j, (such as for example mix server 110) by multiplying input ciphertext elements co-pairs $(a_{jti}, b_{jti})$ with $(y^{\alpha jti}, g^{\alpha jti})$ to obtain $(a_{jti}y^{\alpha jti}, b_{jti}g^{\alpha jti})$ where $(a_{jti}, b_{jti})$ is server j's input ciphertext pair for chain t of re-encryptions. Methods for addition chains are known in the art and are disclosed in D. Bleichenbacher, "Addition Chains for large sets," manuscript, J. Bos M. Coster, "Addition Chain Heuristics," Crypto '89, pp. 400–407.

After the generation of the first stage re-encryption factors, each mix server (of the mix servers 110, 120, and 130 and any further number) individually re-encrypts each ciphertext pair in the list of ciphertext pairs provided to it and also randomly permutates the re-encrypted list of ciphertext pairs provided to it. The resulting re-encrypted and permutated output list of ciphertext pairs for the first re-encryption stage for each mix server, is given to the next server in line. For example first mix server 110 would give in its first chain in first re-encryption stage output list of ciphertext pairs to second mix server 120 as shown in FIG. 3 from steps 302 to 304. The first re-encryption stage (which includes a permutation) is performed to randomize the relative order of the input "list" items for the second re-encryption stage, to prevent a set of servers at the beginning of the second re-encryption stage from mounting an attack made possible by them knowing these relative positions. Since at least one of the servers of servers 110, 120, and 130 is assumed to be honest, the output lists of the first re-encryption stages 222, 232, and 242 have been randomly permuted subject to the first re-encryption.

All the first mix server 110 first re-encryption stages for all the chains can be done at about the same time, in parallel. For example, the first chain first re-encryption stage 302, the second chain first re-encryption stage 312, and the τth chain first re-encryption stage 322 are shown grouped in grouping 332 to show that they can be done in parallel. Similarly the second mix server 120 can perform its first chain, second chain, and τth chain first re-encryption stages 304, 314, and 324 in parallel as shown by grouping 334. The last mix server (and any intervening mix servers) may also perform its first chain, second chain, and τth chain first re-encryption stages 306, 316, and 326 in parallel as shown by grouping 336.

The operations don't have to occur simultaneously but it is preferred that if the first mix server 110, is the first mix server in line in the first chain first re-encryption stage 222 then it is also first on line in the second chain first re-encryption stage 232 through the τth chain first re-encryption stage 242.

Figure 4:
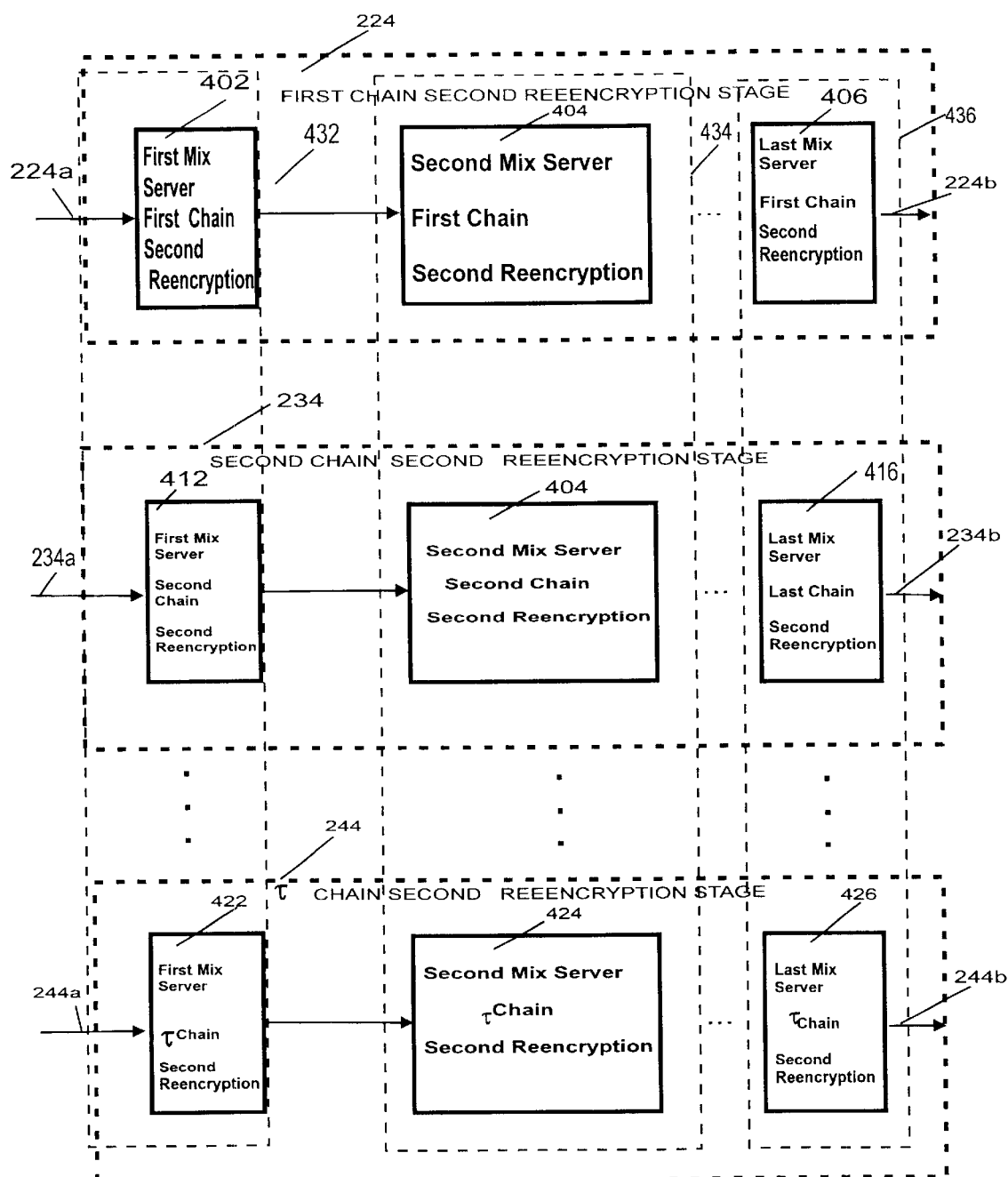
FIG. 4 shows a flow chart concerning the second encryption stages for a plurality of chains of re-encryption.

In fact all of the mix servers in module 222, should perform their first re-encryption stage operation in the same order as in modules 232 and 242. The same is true for the second re-encryption stages 224, 234, and 244 as shown in FIG. 4. In FIG. 4 the first mix server is first in all the chains, the second is second in all second chains, etc.

Each mix server j takes as input during its first re-encryption stage a "list" (includes dummies) of ciphertext pairs $L_{t(j-1)}$, for $1<=t<=\tau$, where t is the chain number (ie first chain, second chain etc). Here j−1 refers to the output list from the previous mix server. For example first mix server 110 (j=1) receives the list $L_{t(1-1)}=L_{t(0)}$, which is the input "list" of ciphertext pairs. Each mix server j then produces lists $L_{tj}$, $1<=t<=\tau$, where $L_{tj}$ is a random and secret permutation $\Pi_{tj}$ of the N+2 elements in the re-encrypted version of the list $L_{t(j-1)}$. Here, the fist re-encryption is performed item-wise (i.e. where an item is a ciphertext pair of a list) by computing the re-encrypted element $(a_{jti}, b_{jti})$ as $(a_{(j-1)ti} \cdot y^{\alpha jti}, b_{(j-1)ti} \cdot g^{\alpha jti})$, using the precompiled re-encryption factors $(y^{\alpha jti}, g^{\alpha jti})$. The resulting output list of ciphertext pairs for each mix server is given to the next mix server in the particular chain. The result of all first re-encryption stages, for all chains (222,232 and 242) is denoted $L'_{to}$, for $1<=t<=\tau$.

For example first mix server 110 (j=1) receives the list $L_{1(0)}$ at point 222a in FIG. 3, for the first chain first re-encryption stage 222 and the first mix server first chain first re-encryption step 302 shown in FIGS. 2 and 3. The first mix server 110 then produces list $L_{1(1)}$ at point 302a. $L_{11}$ is a random and secret permutation $\Pi_{11}$ of the N+2 elements in the re-encrypted version of the input list $L_{1(0)}$.

For the first chain, second mix server 120 first re-encryption stage 222, the step 304 of FIG. 3 is similar to step 302. The second mix server 120 (j=2) receives the list $L_{t(j-1)}=L_{1(1)}$, from the first mix server at point 302a. The second mix server 120 then produces an output list $L_{tj}=L_{1(2)}$. List $L_{tj}=L_{12}$ is a re-encryption and random and secret permutation $\Pi_{12}$ of the N+2 elements of list $L_{1(1)}$.

For the first chain, last mix server 130, and first re-encryption stage 222, the method step 306 of FIG. 3 is similar to steps 302 and 304. The last mix server 120 (j=last) receives the list $L_{1(last-1)}$, from the "last−1" mix server. The last mix server 130 then produces list $L_{1(last)}$ which is a random and secret permutation $\Pi_{1(last)}$ of the N+2 elements in the re-encrypted version of the list $L_{1(last-1)}$.

For the second chain first re-encryption stage 232 and the τth chain first re-encryption stage 242 and any further number of chains, the re-encryption is performed similar to first chain first re-encryption stage 222 only with different re-encryption factors and different permutations.

At the second re-encryption module of each mix server j, a similar re-encryption to the first re-encryption is performed however with independent random values for re-encryption and permutation. The second re-encryption stages 224, 234, and 244 for the first chain, second chain, and τth chains is shown in FIG. 4. This second re-encryption stages (which include a permutation) are employed to guarantee the privacy of the results. For the input lists to the second re-encryption stages $L'_{t0}$, $1<=t<=\tau$, and using new random and secret permutations $\Phi_{tj}$ and the re-encryption factors $(y^{\beta jti}, g^{\beta jti})$. The result of this step is denoted $L''_{t0}=L'_{tlast}$, for $1<=t<=\tau$, where t is the chain number.

For example, by reference to FIG. 4, first mix server 110 (j=1) receives the list $L'_{1(0)}$, at point 224a from the last mix server in the first chain first re-encryption stage 222 at step 402 and produces list $L'_{1(1)}$. $L'_{11}$ is a random and secret permutation $\Pi'_{11}$ of the N+2 elements in the re-encrypted version of the input list $L'_{1(0)}$.

For the first chain, second mix server 120, second re-encryption stage, the method step 404 of FIG. 4 is similar to step 402. The second mix server 120 (j=2) receives the list $L'_{1(1)}$, from the first mix server 110 and produces list $L'_{1(2)}$. List $L'_{12}$ is a random and secret permutation $\Pi'_{12}$ of the N+2 elements in the r-encrypted version of the input list $L'_{1(1)}$.

For the first chain last mix server 130, and second re-encryption stage 224, the method step 406 of FIG. 4 is similar to steps 402 and 404. The last mix server 120 (j=last) receives the list $L'_{1(last-1)}$, from the previous mix server. The last mix server 130 then produces list $L'_{1(last)}$ at output 224b at step 406 in FIG. 4. The list input to the last mix server 130 would come from the second mix server 120 if there are only three mix servers. List $L'_{1(last)}$ is a random and secret permutation $\Pi_{1(last)}$ of the N+2 elements in the encrypted version of the input list $L'_{1(last-1)}$.

The second chain and τth chain of second re-encryption stages 234 and 244, respectively, and any further number of chains, are performed similar to stage 224 only with different re-encryption factors.

After lists $L'_{1(last)}, L'_{2(last)} \ldots L'_{96(last)}$ are output from the stages 224, 234, through 244 (respectively) these lists are used by the first mix server 110 along with the first encryption stages (222, 232, and 242) factors of all mix servers at step 250 to verify all first re-encryption stage (222, 232, and 242) re-encryptions. The list $L'_{t(last)}$ will also be called $L''_{t0}$. The mix servers 120 and 130 will also receive the same information and perform the same verification. FIG. 2 shows graphically that first chain first re-encryption stage factors are revealed from step 222 through path 222c and common path 290 to all of the mix servers 110, 120, and 130 for step 250. Similarly second chain and τ chain first re-encryption stage factors are revealed from stages 232 and 242 through paths 232c and paths 242c, respectively, and common path 290 to all the mix servers 110, 120, and 130. FIG. 2 is merely an explanation flow diagram since the mix servers 110, 120, and 130 all can communicate with each other as shown in FIG. 1.

At the Verification of Aggregate of all First Re-encryption modules (such as modules 250, 252, and 254) each mix server reveals its secret values used in the first re-encryption stages (stage 222, 232, and 242) and the computation is checked by all mix servers. This is done to prevent any server from incorrectly manipulating the lists in the first re-encryption stages.

Each mix server j reveals the permutations $\Pi_{tj}$, and first re-encryption stages (222,232,242) re-encryption factors $\alpha_{jti}$, $1<=t<=\tau$, $1<=i<=n+2$. If the random values to be revealed are generated as the output of a pseudo random function generator ("PRFG") with a seed that is not used for any other random bit generation, this seed can be published in lieu of all the random values, in order to curb communication costs.) Each server computes the first re-encryption stages aggregate permutations $\Pi_t=\Pi_{t1} \circ \ldots \circ \Pi_{tlast}$. Where again t is the number of the chain. Thus each server is computing the permutation that is the same as all the sequential permutations performed by the first re-encryption stages 222,232,242. Then, each server computes the aggregate first re-encryption stage re-encryption factors $\alpha_{ti}$, which is the sum, modulo q, of the individual server-specific re-encryption factors on the path of the permutation. The quantity q can be defined as the maximum size of the exponents where random exponents are chosen from the set of $[0 \ldots q-1]$. The path of the permutation is where each item went as it was permuted and re-encrypted. The servers compute (using addition chains) the pairs $(y^{\alpha ti}, g^{\alpha ti})$ for $1<=t<=\tau$; $1<=i<=N+2$. They then each verify that $L'_{t0}$ (this is the output of the first re-encryption stages) is the permutation $\Pi_t$ of the list $L_{t0}$, using re-encryption pair $(y^{\alpha ti}, g^{\alpha ti})$ for the ith element of $L_{t0}$. This is done plainly by performing said re-encryption and checking for equality.

For example the mix server j=1 (first mix server 110) reveals the permutations $\Pi_{t1}$, and re-encryption factors $\alpha_{1ti}$, $1<=t<=\tau$, $1<=i<=n+2$. Mix servers j=2 to j=last (second mix servers 120 and 130) reveal the permutations $\Pi_{t2}$ to $\Pi_{tlast}$, respectively, and re-encryption factors $\alpha_{2ti}$ to $\alpha_{lastti}$, respectively, for $1<=t<=\tau$, $1<=i<=n+2$.

At the sorting and comparison module 260 the mix servers determine a relative sorting of all the permuted output lists $L"_{t0}$ (for $1<=t<=\tau$, where t is the chain number) using methods to be detailed below and compare the resulting relatively sorted lists. This is done by determining a relative offset of the re-encryption factors used in both the first re-encryption stages (232, 242, i.e. other than for the first chain) and the second re-encryption stages (234, 244, i.e. other than for the first chain), (at the same time as the relative sorting is determined) and re-encrypting each relatively sorted list using these offsets. If the results correspond to one another or preferably are identical, then the mix servers continue. This prevents with an overwhelming probability a set of attackers from successfully altering a portion of the lists, as they must for each copy guess what items correspond to this portion.

What follows is an outline of how the relative sorting and comparison in module 260 can be performed. Two types of lists are created, the so-called "tag list" and the so-called "offset list" (also called the difference list) (whose elements are denoted "tags" and "offsets", respectively).

The tag list contains n+2 unique elements in the range and domain of $f$. "$f$" can be a keyed one-way function that can be described as a pseudo random function generator, and whose output is long enough to make birthday attacks infeasible. For this example, assume that the range and the domain of $f$ are equal but for a negligible fraction of values.

A tag is associated with each list item in list $L_{t0}$. $\tau$ copies of the initial tag list are made. An identical copy of the initial input list of ciphertext pairs (includes dummies) with identical associated tags, one tag for each ciphertext pair is sent to input 222a, 232a, and 242a by reference to FIG. 2. Each tag is associated with its ciphertext pair or dummy pair but does not perform any operation on the ciphertext pair. Each mix server during an encryption stage permutes the tags in the same way as their associated ciphertext pairs. However, the tags are not re-encrypted like their associated ciphertext pairs. At each re-encryption stage of each mix server each tag has a one-way function applied to it.

For example, mix server 110 at step 302 shown in FIG. 3 permutes the tags at 222a together with its ciphertext pairs. In addition each tag is subject to a one way function to form modified tags. Thus permuted and modified tags are produced at the output 302a. This same technique, only with different permutations and different one way functions is done for each re-encryption stage at each mix server.

The offset lists, of which there are $\tau-1$, (one copy for each re-encryption chain except the first chain) (numbered 2 ... $\tau$), contains the n+2 aggregate relative re-encryption exponents used per ciphertext pair during the first re-encryption stage, permuted in the same manner as relative permutations of the tag lists, i.e. as the relative permutations of the ciphertext lists. Thus, re-encrypting the output lists $L'_{t0}$, numbered 2 ... $\tau$, from the first re-encryption stages (232, 242, but not 222) using these aggregate relative re-encryption exponents would render resulting lists which are equal, but for their order. (This is, however, not done.) Each such relative re-encryption exponent is computed using the corresponding ciphertext pair of the first list $L'_{10}$ (at output 224a) as its reference.

In the tag—and offset—computation phase of step 260 in FIG. 2, each mix server of the mix servers 110, 120, and 130, in the same order as they performed the action during the second re-encryption phase (includes 234 and 244), perform the following: First, the mix server verifies that all (within each tag list of tag lists 1 through $\tau$) the tags of each such tag list are different from each other (a multitude of methods are known in the art for doing this, spanning the spectrum of time vs. space trade-offs exist, see D. E. Knuth, "The Art of Computer Programming," Volume 2—*Seminumerical algorithms*, Addison Wesley, second edition, 1981). Then, each mix server (of servers 110, 120, and 130) applies the function $f$, keyed with a secret and random key only this server knows to all the list items of all the tag lists. Next, each server updates the list items of the offset lists by adding in the relative re-encryption exponents $\sigma_{it}=\beta_{it}-\beta_{i1}$, where the difference is taken between items with identical tags, from the current list from the appropriate chain and the first list for the first chain of re-encryptions. Finally, he applies the same permutation to the updated lists as was applied by him during the second re-encryption stage, and passes the updated and permuted lists on to the next mix server.

A plurality of tagging lists and a plurality of offset lists are produced. The plurality of tagging lists indicates the relative order of items of the lists $L"_{t0}$ produced after the second re-encryption stages and the plurality of relative re-encryption exponent lists use the first chain output list $L"_{10}$ as a reference and indicate the relative exponents used for encryption between list t and the first chain list for the different values $2<=t<=\tau$. After all servers perform the above, the tag list is discarded (as it was only used to generate the correct offset list). All the elements of the lists that constitute the output of the second re-encryption stages, except for those of the first chain, are re-encrypted using the relative re-encryption exponents contained in the offset lists. (Again, the re-encryption factors are generated from the re-encryption exponents using addition chains.) Then, the lists are sorted according to the relative order indicated by the tag lists or some other arbitrary order in which they are all sorted and compared. If they are not identical then somebody must have cheated.

The positions of the first and the second dummy are determined by a selective trace-through of the mix. For each mix server step of the second re-encryption stages, the server who performed the permutation and re-encryption publishes the sum (modulo q) of all re-encryption exponents used for all the elements except for the second dummy. Each server also publishes the re-encryption exponent used for the second dummy alone, and a description of how the two dummies were permuted. Then, each mix server proves that that mix server knows the re-encryption factors employed for the first dummy (thereby substantiating that it was permuted as claimed.) All servers verify that the product of all input elements, except the second dummy, correspond to the product of the same output list. This is done by verifying the ciphertext corresponding to the product of all input items except for the second dummy, re-encrypted using the published sum, results in a ciphertext that is the product of all the output elements—except for the second dummy again. (Note that it does not reveal this product, since the plaintexts of the dummies are unknown and uniformly distributed.) Finally, the re-encryption of the second dummy is verified. If no cheater was found, then the dummies are removed from the re-encrypted and permuted output list at step 262, and the resulting list output at step 264.

If cheating is detected during any step of the process shown in flow chart 200, all honest mix servers halt, and a cheater detection phase commences (in this phase, all secret random values are revealed, and the cheater(s), including those who will not cooperate, are pinpointed and replaced). We note that the plaintexts remain unrevealed. Afterwards, the protocol is restarted if a cheater was detected.

At the module for verification of dummy ciphertext pairs 262 the position of and correctness of the two dummy ciphertext pairs are determined, as previously outlined, after which they are removed from the list, and the resulting output list can be output from any of the mix servers 110, 120, or 130. The output is signed by all the cooperating mix servers to certify the correctness of the output. The signed output 264 of module 262 is a signal indicating acceptability which indicates all the sorted lists, each corresponding to one of the input list copies from 1 to $\tau$, have met the criteria that their items are the same. Only one of the final output lists, e.g., list 1 (from chain 1) needs to be signed and output since the lists are all equal if everything went well.

The applicant's previous mix network has a cost per input item (of the initial input encrypted list) and per active mix server of about eighty exponentiations, each one of which costs about 200 multiplications for an exponent size of 160 bits using standard window based exponentiation techniques. For the same number of input items and security parameters the cost of the mix network shown in the embodiment of FIGS. 1, 3, and 4 and described in the present application is less than 200 multiplications per list item (of the initial input list) and per server, giving a speedup factor of 80 compared to the fastest known previous method.

Figure 5:
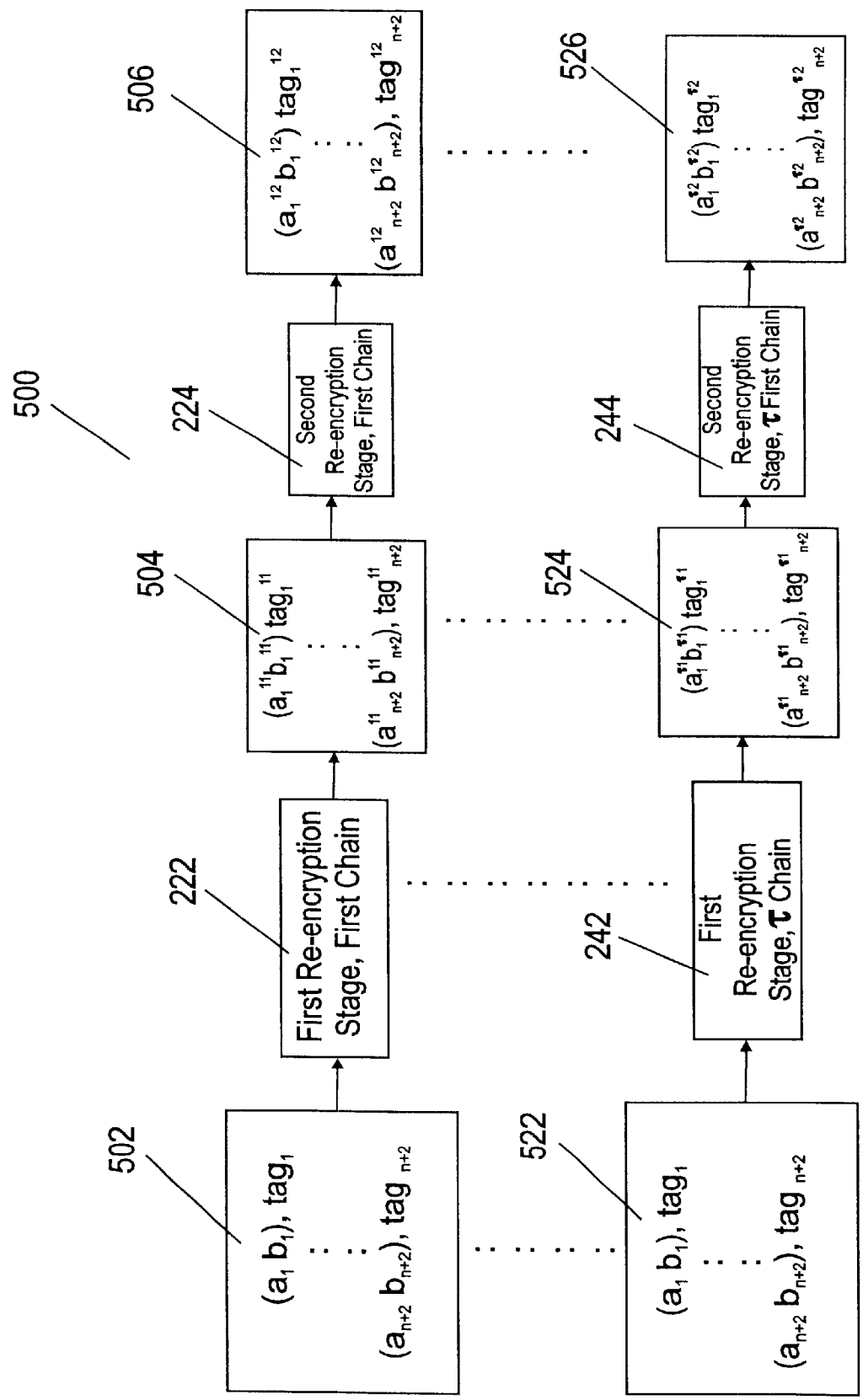
FIG. 5 shows a flow chart explaining the use of tag lists in accordance with the present invention.

FIG. 5 shows a flow chart 500 which describes operation of the tag lists. A tag may be attached to each ciphertext pair. For example as shown at step 502 for the first copy, $tag_1$ may be attached to ciphertext pair $(a_1, b_1)$, a $tag_2$ may be attached to ciphertext pair $(a_2, b_2)$ and so on through ciphertext pair $(a_{n+2}, b_{n+2})$ which has a $tag_{n+2}$ attached to it. The ciphertext pairs would then next be input to the first re-encryption stage of the first chain of re-encryptions at step 222. The stage 222 would also include applying a one way function to each item of the tag list. Each item of the tag list would be permuted in the manner of its attached ciphertext pair, however the items of the tag list would not be encrypted like the ciphertext pairs. The first re-encryption stage of the first chain of re-encryptions 222 would produce a list of ciphertext pairs $a_1^{11}, b_1^{11} \ldots a_{n+2}^{11}, b_{n+2}^{11}$ having corresponding tags $tag_1^{11}$ through $tag_{n+2}^{11}$ respectively, show at step 504 of FIG. 5. The above notation is merely used to show the ciphertext pairs that are produced after each re-encryption stage and is not related to previous notations. In the above notation "$a_{n+2}^{11}$" for example, is for the (n+2)th item of the "$1^{st}$" chain after the "$1^{st}$" re-encryption stage. The quantity "$a_{n+2}^{12}$" is for the (n+2)th item of the "$1^{st}$" chain after the "$2^{nd}$" re-encryption stage. These ciphertext pairs and their tags are then sent to the second re-encryption stage 224 of the first chain of re-encryptions. Each item of the tag list would again be permuted in the same manner of its attached ciphertext pair, however the items of the tag list would not be encrypted like the ciphertext pairs. The second re-encryption stage 224 of the first chain of re-encryptions would produce a list of ciphertext pairs $a_1^{12}, b_1^{12} \ldots a_{n+2}^{12}, b_{n+2}^{12}$ having corresponding tags $tag_1^{12}$ through $tag_{n+2}^{12}$ respectively shows in step 506.

Similarly the other input list copies 2 through $\tau$ would be subjected to similar steps. For example, for the $\tau$th chain at step 522 the ciphertexts $(a_1, b_1) \ldots (a_{n+2}, b_{n+2})$ would have $tag_1$ through $tag_{n+2}$ attached or associated with them respectively (one tag one for each ciphertext pair). These are the same tags attached or associated in step 502 (and for all the other chains). At step 242 the ciphertext pairs and their attached tags are subjected to permutations of a plurality of mix servers, the attached tags are subjected to one way functions, one each for a plurality of mix servers, and the ciphertext pairs are subjected to a plurality of re-encryptions, one for each mix server. The first re-encryption stage 242 for the $\tau$th copy produces a list of ciphertext pairs produce a list of ciphertext pairs $a_1^{\tau 1}, b_1^{\tau 1} \ldots a_{n+2}^{\tau 1}, b_{n+2}^{\tau 1}$ having corresponding tags $tag_1^{\tau 1}$ through $tag_{n+2}^{\tau 1}$ respectively. The list of tags $tag_1^{\tau 1} \ldots tag_{n+2}^{\tau 1}$ output from the first re-encryption stage 242 $\tau$th chain of re-encryptions is the same as the list of tags $tag_1^{11} \ldots tag_{n+2}^{11}$ output from the first re-encryption stage 222 except that the tags may be in different orders. The tag lists will be the same for the $1^{st}$ through $\tau$th chains except for the order in which they are in. The ciphertext pairs and their tags are then sent to the second re-encryption stage of the $\tau$th chain of re-encryptions at step 244. The second re-encryption stage 244 of the $\tau$th chain of re-encryptions would produce a list of ciphertext pairs $a_1^{\tau 2}, b_1^{\tau 2} \ldots a_{n+2}^{\tau 2}, b_{n+2}^{\tau 2}$ having corresponding tags $tag_1^{\tau 2}$ through $tag_{n+2}^{\tau 2}$ respectively shown at step 526. The tag lists (and their attached ciphertexts) produced at steps 506 and 526 (and corresponding steps for the other chains) would all be sorted so that their attached ciphertexts can be compared. For example, $tag_1^{12}$ for the first copy may be the same as $tag_{n+2}^{\tau 2}$ of the $\tau$th copy. This means that the ciphertext pairs $(a_1^{12}, b_1^{12})$ and $(a_{n+2}^{\tau 2}, a_{n+2}^{\tau 2})$ are different encryptions of the same plaintext message. These ciphertext pairs can be compared by applying all the relative re-encryption factors introduced by all the mix servers in the first and second re-encryption stages (242 and 244) of the $\tau$th chain of re-encryptions. By applying these relative re-encryption factors we undo the differences between the lists (but not between the lists and the original input list because that would leak the order).

Figure 6:
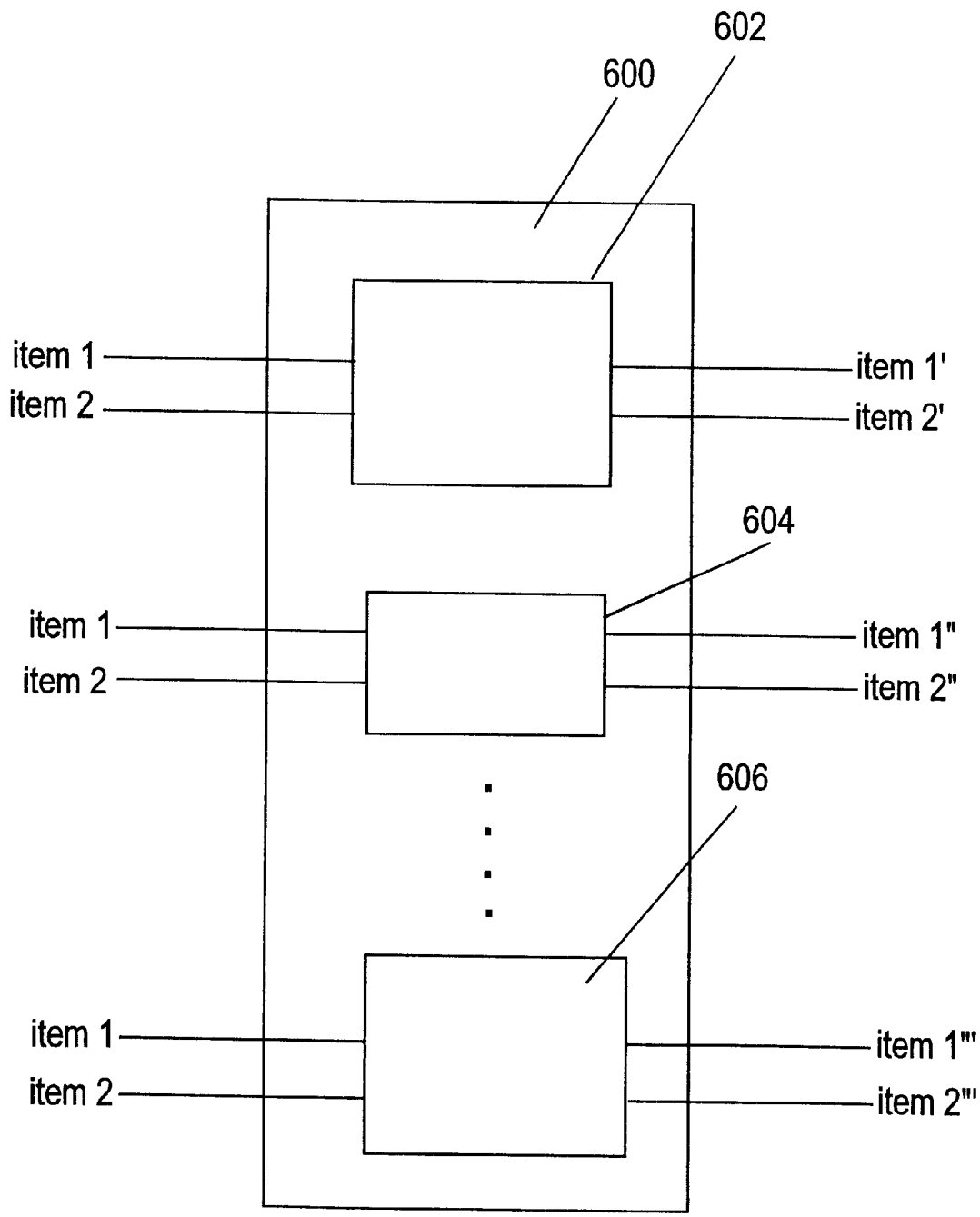
FIG. 6 shows a flow chart for explaining the use of re-encryption differences in accordance with the present invention.

Each mix server would keep track of the relative re-encryption factors with respect to the first copy. The use of relative re-encryption factors will be described with reference to FIG. 6 and to the table below. A mix server 600 may have modules 1 through $\tau$ for receiving and applying re-encryptions to 1 through $\tau$ lists for a corresponding number of chains. For example the server 600 may include modules 602, 604, and 606 and further modules not shown. For simplification, assume that each module receives the same list of items item1 and item2 and in this example that there is no permutation. The module 602 would take the first copy of list items of item1 and item 2 and perform a re-encryption on item1 to form item1' and perform different re-encryption on item2 to form item2'. Similarly modules 604 and 606 would take the second copy and the $\tau$th copies of list item1, item2, perform different re-encryptions to form item1", item2" and item1''' and item2''' respectively. The server 600 may store the relative re-encryption factors relative to the re-encryptions for the first copy or chain. Thus for the first copy, the relative re-encryptions are zero and for the other copies the relative re-encryption factors are the difference between the encryption for that copy and for the first copy on a per item basis.

| Encryption Factor | Relative Encryption Factor |
|---|---|
| α1 (for item 1 for module 802) | 0 |
| α2 (for item 2 for module 802) | 0 |
| γ1 (for item 1 for module 804) | γ1−α1 |
| γ2 (for item 2 for module 804) | γ2−α2 |

-continued

| Encryption Factor | Relative Encryption Factor |
|---|---|
| z1 (for item 1 for module 806) | z1−α1 |
| z2 (for item 2 for module 806) | z2−α2 |

When all the relative re-encryption factors are applied for a particular chain of re-encryptions (such as for example the second chain of re-encryptions comprised of stages 232 plus 234 in FIG. 2) all the ciphertext pairs with corresponding tags can be compared. For example, by applying all the relative re-encryptions to $(a_{n+2}^{\tau 2}, b_{n+2}^{\tau 2})$ for the first and second stages (242 and 244) of the τth chain of re-encryptions we should obtain $(a_1^{12}\ b_1^{12})$, assuming $(a_{n+2}^{\tau 2}, a_{n+2}^{\tau 2})$ and $(a_1^{12}\ b_1^{12})$ correspond to the same plaintext message. This allows us to prove that no one has cheated and without revealing the actual encryptions used, i.e. only the relative encryption factors are disclosed by each mix server. Each mix server would supply its relative re-encryption factors (which are also called herein re-encryption differences) to all other mix servers and each mix server can verify that the results for all chains come out to be equal when the relative factors are applied.

For the example of FIG. 2 each mix server would have a first chain first stage re-encryption difference list or offset list for step 222, a second chain first stage re-encryption stage difference list for step 232, and a τ chain first stage re-encryption stage difference for step 242, etc. Each mix server would also have a first chain second stage re-encryption difference list for step 224, a second chain second stage re-encryption stage difference list for step 234, and a τ chain second stage re-encryption stage difference list for step 244, etc.

I claim:

1. A method comprising:
   applying a first chain of re-encryptions to a first copy of an input list of encrypted items to produce a first copy output list of items;
   applying a second chain of re-encryptions to a second copy of an input list of encrypted items to produce a second copy output list of items
   sorting the second copy output list to produce a second copy sorted list and sorting the first copy output list to produce a first copy sorted list so that the first copy sorted list and the second copy sorted lists can be compared with each other;
   producing a signal indicative of acceptability if the first copy sorted list and the second copy sorted list meet a criteria.

2. The method of claim 1 wherein:
   the first copy sorted list and the second copy sorted list are both comprised of a plurality of ciphertext messages.

3. The method of claim 1 wherein:
   the criteria is that the first copy sorted list and the second copy sorted list both have exactly the same plaintext items.

4. The method of claim 1 wherein
   the first chain of re-encryptions is comprised of a first chain first re-encryption stage and a first chain second re-encryption stage;
   the second chain of re-encryptions is comprised of a second chain first re-encryption stage and a second chain second re-encryption stage; and
   wherein the first chain first re-encryption stage differs from the second chain first re-encryption stage and the first chain second re-encryption stage differs from the second chain second re-encryption stage.

5. The method of claim 1 wherein:
   each re-encryption stage applies a permutation factor and a re-encryption factor;
   and following the application of the second re-encryption stages of the first chain of re-encryptions and the second chain of re-encryptions, the permutation factors and re-encryption factors of the first re-encryption stages of the first chain of re-encryptions and the second chain of re-encryptions are revealed to a plurality of mix servers;
   each of the plurality of mix servers determine an aggregate permutation and an aggregate re-encryption factor for both the first chain first re-encryption stage and the second chain first re-encryption stage;
   each of the plurality of mix servers determine whether
      the output list of items from the first chain of re-encryptions is the permutation of the input list of items using the aggregate re-encryption factors and aggregate permutation factors for the first chain first re-encryption stage; and
      the output list of items from the second chain of re-encryptions is the permutation of the input list of items using the aggregate re-encryption factors and the aggregate permutation factors for the second chain first re-encryption stage.

6. The method of claim 1 further comprising
   associating one tag of a first copy input tag list with each item of the first copy of the input list of encrypted items, wherein each item of the first copy of the input list has a different tag;
   associating one tag of a first copy input tag list with each item of the second copy of the input list of encrypted items, wherein each item of the second copy of the input list has a different tag;
   wherein each item of the first copy of the input list has the same tag as its corresponding item in the second copy of the input list;
   wherein the first copy of the input list is subject to a first aggregate permutation;
   wherein the second copy of the input list is subject to a second aggregate permutation;
   wherein each item of the first copy output list has associated with it a tag of a first copy output tag list, where the first copy output tag list is derived from the first copy input tag list;
   wherein each item of the second copy output list has associated with it a tag of a second copy output tag list, where the second copy output tag list is derived from the second copy input tag list;
   wherein the first and second copy output tag lists have the same tags;
   wherein the first and second copy output lists are sorted by arranging the tags of the first and second copy output tag lists, and thereby the associated items of the first and second copy output lists, so that each item of the first copy output tag list is in the same order as its corresponding item of the second copy output tag list.

7. The method of claim 6 wherein
   the first copy input list and the second copy input list correspond to the same plaintext items.

8. The method of claim 6 wherein
   the first copy output tag list is derived from the first copy input tag list by subjecting the first copy input tag list to a plurality of one way functions; and the second copy output tag list is derived from the first copy input tag list by subjecting the first copy input tag list to a plurality of one way functions.

9. The method of claim 6 further comprising the steps of determining a second copy re-encryption difference which is the difference between the re-encryption performed by the second chain of re-encryptions and the first chain of re-encryptions and applying this second copy re-encryption difference to the second copy output list to form a difference adjusted second copy output list;

comparing the first copy output list with the difference adjusted second copy output list.

10. The method of claim 9 wherein the first chain of re-encryptions is comprised of a first chain first re-encryption stage and a first chain second re-encryption stage;

the second chain of re-encryptions is comprised of a second chain first re-encryption stage and a second chain second re-encryption stage; and wherein the first chain first re-encryption stage differs from the second chain first re-encryption stage and the first chain second re-encryption stage differs from the second chain second re-encryption stage.

11. The method of claim 10 wherein the first chain first re-encryption stage is comprised of a plurality of re-encryptions, one re-encryption performed by each one of a first set of a plurality of mix servers;

the second chain first re-encryption stage is comprised of a plurality of re-encryptions, one re-encryption performed by each one of the first set of plurality of mix servers;

the first chain second re-encryption stage is comprised of a plurality of re-encryptions, one re-encryption performed by each one of the first set of a plurality of mix servers; and the second chain second re-encryption stage is comprised of a plurality of re-encryptions, one re-encryption performed by each one of the first set of plurality of mix servers.

12. The method of claim 11 wherein:

each one of the first set of plurality of mix servers performs its first chain first re-encryption stage re-encryption and its second chain first re-encryption stage re-encryption at the same time.

13. The method of claim 12 wherein:

each one of the first set of plurality of mix servers performs its first chain second re-encryption stage re-encryption and its second chain second re-encryption stage re-encryption at the same time.

14. The method of claim 11 wherein wherein each mix server of the first set has:
 a first re-encryption stage mix server re-encryption difference which is the difference between the re-encryption applied during the first chain of re-encryptions and the re-encryption applied during the second chain of re-encryptions by that mix server;
 a second re-encryption stage mix server re-encryption difference which is the difference between the re-encryption applied during the first chain of re-encryptions and the re-encryption applied during the second chain of re-encryptions by that mix server;

and the second copy re-encryption difference is determined from the plurality of first re-encryption stage mix server re-encryption differences and from the plurality of second re-encryption stage mix server re-encryption differences.

15. The method of claim 13 wherein wherein each mix server of the first set has:
 a first re-encryption stage mix server re-encryption difference which is the difference between the re-encryption applied during the first chain of re-encryptions and the re-encryption applied during the second chain of re-encryptions by that mix server;
 a second re-encryption stage mix server re-encryption difference which is the difference between the re-encryption applied during the first chain of re-encryptions and the re-encryption applied during the second chain of re-encryptions by that mix server;
 and the second copy re-encryption difference is determined from the plurality of first re-encryption stage mix server re-encryption differences and from the plurality of second re-encryption stage mix server re-encryption differences.

16. An apparatus comprising:

a module comprising a plurality of mix servers having an input;

a sorting and comparison module having an input connected to the output of the module of the plurality of mix servers;

wherein a first copy of an input list of encrypted items is subjected by a first chain of re-encryptions wherein each mix server of the plurality of mix servers provides at least one re-encryption for the first chain;

wherein the first chain of re-encryptions produces a first copy output list of items;

wherein a second copy of the input list of encrypted items is subjected to a second chain of re-encryptions wherein each mix server of the plurality of mix servers provides at least one re-encryption for the second chain;

wherein the second chain of re-encryptions produces a second copy output list of items;

wherein the sorting and comparison module sorts the second copy output list to produce a second copy sorted list and sorts the first copy output list to produce a first copy sorted list so that the first copy sorted list and the second copy sorted list can be compared with each other; and wherein the sorting and comparison module producing a signal indicative of acceptability if the first copy sorted list and the second copy sorted list meet a criteria.

17. The apparatus of claim 16 wherein:

the criteria is that the first copy sorted list and the second copy sorted list both correspond to the same plaintext items.

18. An apparatus comprising:

a first mix server;

a second mix server;

the first mix server and the second mix server connected to each other by a data bus;

wherein during a first copy first re-encryption stage:
 the first mix server receives a first copy first list of a plurality of items,
 the first mix server applies a first re-encryption of a first copy first re-encryption stage to each item of the first copy first list to produce a first copy second list of a plurality of items;

the first mix server applies a first permutation of the first copy first re-encryption stage to the first copy second list to produce a first copy third list of a plurality of items;

the second mix server receives the first copy third list;

the second mix server applies a second re-encryption of the first copy first re-encryption stage to each item of the first copy third list to produce a first copy fourth list of a plurality of items;

the second mix server applies a second permutation of the first copy first re-encryption stage to the first copy fourth list to produce a first copy fifth list of a plurality of items;

wherein during a first copy second re-encryption stage:

the first mix server receives a first copy sixth list of a plurality of items which is based on the first copy fifth list;

the first mix server applies a first re-encryption of the first copy second re-encryption stage to each item of the first copy sixth list to produce a first copy seventh list of a plurality of items;

the first mix server applies a first permutation of a first copy second re-encryption stage to the first copy seventh list to produce a first copy eighth list of a plurality of items;

the second mix server receives the first copy eighth list;

the second mix server applies a second re-encryption of the first copy second re-encryption stage to each item of the first copy eighth list to produce a first copy ninth list of a plurality of items;

the second mix server applies a second permutation of the first copy second re-encryption stage to the first copy ninth list to produce a first copy tenth list of a plurality of items;

wherein during a verification stage for the first copy:

the first mix server transmits a plurality of re-encryption factors and a permutation for the first re-encryption of the first copy first re-encryption stage to the second mix server;

the second mix server transmits a plurality of re-encryption factors and a permutation for the second re-encryption of the first copy first re-encryption stage to the first mix server;

the first mix server and the second mix server use the plurality of re-encryption factors and the permutation for the first re-encryption of the first copy first re-encryption stage and the plurality of re-encryption factors and the permutation for the second re-encryption of the first copy first re-encryption stage to compute a set of aggregate first re-encryption stage re-encryption factors and an aggregate first re-encryption stage permutation;

the first mix server and the second mix server verify that a first copy eleventh list of a plurality of items, which is based on the first copy tenth list, was derived in part by applying re-encryptions which have the aggregate first copy first re-encryption stage re-encryption factors and was derived in part by applying the aggregate first copy first re-encryption stage permutation.

19. The apparatus of claim 18 wherein:
each item of the first copy first list is a pair of ciphertexts.

20. The apparatus of claim 19 wherein:
the first copy first list includes a plurality of input ciphertext pairs each corresponding to a plaintext message.

21. The apparatus of claim 19 wherein:
the first copy first list includes at least one dummy ciphertext pair.

22. The apparatus of claim 18 wherein:
the first mix server receives a second copy first list of a plurality of items, the first mix server applies a first re-encryption of a second copy first re-encryption stage to each item of the second copy first list to produce a second copy second list of a plurality of items;

the first mix server applies a first permutation of the second copy first re-encryption stage to the second copy second list to produce a second copy third list of a plurality of items;

the second mix server receives the second copy third list;

the second mix server applies a second re-encryption of the second copy first re-encryption stage to each item of the second copy third list to produce a second copy fourth list of a plurality of items;

the second mix server applies a second permutation of the second copy first re-encryption stage to the second copy fourth list to produce a second copy fifth list of a plurality of items;

wherein during a second copy second re-encryption stage:

the first mix server receives a second copy sixth list of a plurality of items which is based on the second copy fifth list;

the first mix server applies a first re-encryption of a second copy second re-encryption stage to each item of the second copy sixth list to produce a second copy seventh list of a plurality of items;

the first mix server applies a first permutation of a second copy second re-encryption stage to the second copy seventh list to produce a second copy eighth list of a plurality of items;

the second mix server receives the second copy eighth list;

the second mix server applies a second re-encryption of the second copy second re-encryption stage to each item of the second copy eighth list to produce a second copy ninth list of a plurality of items;

the second mix server applies a second permutation of the second copy second re-encryption stage to the second copy ninth list to produce a second copy tenth list of a plurality of items;

wherein during a second copy verification stage:

the first mix server transmits a plurality of re-encryption factors and a permutation for the first re-encryption of the second copy first re-encryption stage to the second mix server;

the second mix server transmits a plurality of re-encryption factors and a permutation for the second re-encryption of the second copy first re-encryption stage to the first mix server;

the first mix server and the second mix server use the plurality of re-encryption factors and the permutation for the first re-encryption of the second copy first re-encryption stage and the plurality of re-encryption factors and the permutation for the second re-encryption of the second copy first re-encryption stage to compute a set of aggregate second copy first re-encryption stage re-encryption factors and an aggregate second copy first re-encryption stage permutation; and the first mix server and the second mix server verify that a second copy eleventh list of a plurality of items, which is based on the second copy tenth list, was derived in part by applying re-encryptions which have the aggregate second copy first re-encryption stage re-encryption factors and was derived in part by applying the aggregate second copy first re-encryption stage permutation.

23. The apparatus of claim 22 and wherein:

the aggregate first re-encryption stage for the first copy re-encryption factors are different from the aggregate first re-encryption stage for the second copy re-encryption factors; and the aggregate first re-encryption stage for the first copy permutation is different from the aggregate first re-encryption stage for the second copy permutation.

24. The apparatus of claim 22 wherein:

the first copy first list is the same as the second copy first list;

and the first copy second, third, fourth, fifth, sixth, seventh, eighth, ninth, tenth, and eleventh lists are different from the second copy second, third, fourth, fifth, sixth, seventh, eighth, ninth, tenth, and eleventh lists.

25. The apparatus of claim 22 wherein:

during a sorting and comparison stage the first mix server sorts the first copy eleventh list to determine a first copy twelfth list;

the second mix server sorts the second copy eleventh list to determine a second copy twelfth list; and the first copy twelfth list and the second copy twelfth list are compared to determine if they satisfy a certain criteria.

26. The apparatus of claim 25 wherein:

the first copy twelfth list and the second copy twelfth list are compared to determine if they are equal.

27. The apparatus of claim 25 wherein:

during the sorting and comparison stage the second mix server compares the second copy twelfth list with the first copy twelfth list by determining a set of relative offsets of a second set of re-encryption factors which were used for the second copy first and second re-encryption stages from a first set of re-encryption factors which were used for the first copy first and second re-encryption stages.

* * * * *